United States Patent
Zhang

(10) Patent No.: US 10,088,318 B2
(45) Date of Patent: Oct. 2, 2018

(54) CRADLE ROTATION INSENSITIVE INERTIAL NAVIGATION

(71) Applicant: QUALCOMM Incorporated, San Diego, CA (US)

(72) Inventor: Wentao Zhang, Cupertino, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 14/837,815

(22) Filed: Aug. 27, 2015

(65) Prior Publication Data
US 2017/0059326 A1    Mar. 2, 2017

(51) Int. Cl.
| H04N 7/18 | (2006.01) |
| G01C 21/16 | (2006.01) |
| G01C 25/00 | (2006.01) |
| G06T 7/00 | (2017.01) |
| H04N 5/225 | (2006.01) |
| H04B 1/3877 | (2015.01) |
| H04W 4/02 | (2018.01) |
| G06T 7/73 | (2017.01) |

(52) U.S. Cl.
CPC .......... *G01C 21/165* (2013.01); *G01C 25/00* (2013.01); *G06T 7/0024* (2013.01); *G06T 7/74* (2017.01); *H04B 1/3877* (2013.01); *H04N 5/2251* (2013.01); *H04W 4/027* (2013.01); *G06T 2207/30244* (2013.01)

(58) Field of Classification Search
None
See application file for complete search history.

(56) References Cited

U.S. PATENT DOCUMENTS

| 6,594,600 | B1* | 7/2003 | Arnoul | G01B 11/2755 382/154 |
| 6,975,959 | B2* | 12/2005 | Dietrich | G01C 21/206 342/357.32 |
| 7,337,650 | B1* | 3/2008 | Preston | B60W 40/11 73/1.38 |
| 8,698,875 | B2* | 4/2014 | Anguelov | G06T 7/004 348/135 |
| 9,111,351 | B2* | 8/2015 | Martensson | G06T 7/0075 |

(Continued)

FOREIGN PATENT DOCUMENTS

WO    WO 2012075466 A1 *  6/2012  ........... G01C 21/165

OTHER PUBLICATIONS

International Search Report and Written Opinion—PCT/US2016/040255—ISA/EPO—dated Oct. 21, 2016—13 pgs.

*Primary Examiner* — Thomas G Black
*Assistant Examiner* — Demetra R Smith-Stewart
(74) *Attorney, Agent, or Firm* — Hunter Clark PLLC

(57) ABSTRACT

Techniques are provided which may be implemented using various methods and/or apparatuses in a mobile device to provide cradle insensitive inertial navigation. An example method for determining alignment changes between a first body frame and a second body frame according to the disclosure includes obtaining one or more images from an image capture device associated with the first body frame in response to detecting a change in alignment between the first body frame and the second body frame, determining a compensation information based on an analysis of the one or more images, and determining a position based on one or more inertial sensors and the compensation information.

31 Claims, 10 Drawing Sheets

(56) References Cited

U.S. PATENT DOCUMENTS

| | | | |
|---|---|---|---|
| 9,151,613 B2* | 10/2015 | Czompo | G01C 21/00 |
| 9,270,891 B2* | 2/2016 | Anguelov | G06T 7/004 |
| 9,488,736 B2* | 11/2016 | Weisenburger | G01S 19/48 |
| 2006/0146136 A1 | 7/2006 | Cho | |
| 2009/0254279 A1* | 10/2009 | Han | G01C 21/16 |
| | | | 701/501 |
| 2010/0017115 A1 | 1/2010 | Gautama | |
| 2011/0178708 A1 | 7/2011 | Zhang et al. | |
| 2012/0022780 A1* | 1/2012 | Kulik | G01C 21/28 |
| | | | 701/498 |
| 2012/0038549 A1* | 2/2012 | Mandella | G06F 3/03545 |
| | | | 345/156 |
| 2012/0173140 A1* | 7/2012 | Czompo | G01C 25/005 |
| | | | 701/472 |
| 2012/0176492 A1* | 7/2012 | Garin | G01C 25/005 |
| | | | 348/116 |
| 2013/0002857 A1 | 1/2013 | Kulik | |
| 2013/0041585 A1* | 2/2013 | Czompo | G01C 21/00 |
| | | | 701/505 |
| 2013/0194428 A1 | 8/2013 | Chao et al. | |
| 2014/0037136 A1 | 2/2014 | Ramalingam et al. | |
| 2014/0094200 A1 | 4/2014 | Schatzberg et al. | |
| 2014/0375493 A1* | 12/2014 | Weisenburger | G01S 19/48 |
| | | | 342/357.3 |
| 2016/0098095 A1* | 4/2016 | Gonzalez-Banos | |
| | | | G06F 3/03545 |
| | | | 345/156 |
| 2016/0179218 A1* | 6/2016 | Rosenzweig | G06F 3/0346 |
| | | | 345/156 |
| 2016/0290808 A1* | 10/2016 | Barrau | G01C 25/005 |

* cited by examiner

US 10,088,318 B2

CRADLE ROTATION INSENSITIVE INERTIAL NAVIGATION

BACKGROUND

Global Navigation Satellite System (GNSS) receivers have been incorporated into a multitude of devices, including mobile devices such as mobile phones, wrist watches, and other portable devices. Many small mobile devices are configured to be mounted in a cradle device, or worn by a user, and may make use of GNSS signals and Inertial Navigation Systems (INS) to provide positioning information. Positioning estimates may be calculated by receiving and processing satellite positioning signals. Satellite positioning signals, however, are often blocked and a mobile device may utilize inertial navigation techniques to estimate an incremental position. GNSS receivers also generally require more power, which can be an issue with smaller mobile devices. A mobile device may opt to utilize inertial navigation techniques in an effort to conserve battery power.

Inertial navigation techniques may rely on measurement data from inertial sensors (e.g., accelerometers and gyroscopes). However, errors in the position results generated from the inertial sensors may occur when the relative orientation between the sensors and the object in motion are misaligned. Such a misalignment may cause the position results to become less reliable and the misalignment must be calibrated and compensated. The reliability of the position estimates may be further diminished over time because of increasing drift, inaccurate misalignment calibration, or subsequent changes in the relative alignments between the sensors and the object in motion.

SUMMARY

An example apparatus for determining alignment changes between a first body frame and a second body frame according to the disclosure includes a memory unit, one or more inertial sensors, at least one processor communicatively coupled to the memory unit and the one or more inertial sensors and configured to obtain one or more images from an image capture device associated with the first body frame in response to detecting a change in alignment between the first body frame and the second body frame, determine a compensation information based on an analysis of the one or more images, and determine a position based on the one or more inertial sensors and the compensation information.

Implementations of such an apparatus may include one or more of the following features. The compensation information may include a displacement change and a pose change. The analysis of the one or more images may include identifying features in the one or more images, calculating a rotation matrix based on the identified features, and generating a pose change estimate based on the rotation matrix. The pose change estimate may include an uncertainty value generated by the at least one processor. The one or more inertial sensors may be an accelerometer. Detecting the change in alignment between the first body frame and the second body frame may be derived from at least one of the inertial sensors. The at least one processor may be configured to provide a synchronization signal, determine a first orientation between the first body frame and the second body frame, obtain an initial first image with the image capture device, wherein the initial first image is associated with the first orientation, and determine the compensation information based the analysis of the one or more images and the initial first image.

An example method for determining alignment changes between a first body frame and a second body frame according to the disclosure includes obtaining one or more images from an image capture device associated with the first body frame in response to detecting a change in alignment between the first body frame and the second body frame, determining a compensation information based on an analysis of the one or more images, and determining a position based on one or more inertial sensors and the compensation information.

Implementations of such a method may include one or more of the following features. The compensation information may include a displacement change and a pose change. The analysis of the one or more images may include identifying common features in the one or more images, calculating a rotation matrix based on the identified common features, and generating a pose change estimate based on the rotation matrix. Generating the pose change estimate may include generating an uncertainty value. Detecting the change in alignment between the first body frame and the second body frame may be based on information received from an inertial sensor. A detection of the change in alignment and the determining of the compensation information may be synchronized. A first orientation between the first body frame and the second body frame may be determined, an initial first image may be obtained with the image capture device, such that the initial first image is associated with the first orientation, and the compensation information may be determined based the analysis of the one or more images and the initial first image. The compensation information may be output to an inertial navigation system.

An example of a non-transitory machine-readable medium for determining alignment changes between a first body frame and a second body frame according to the disclosure includes code for obtaining one or more images from an image capture device associated with the first body frame in response to detecting a change in alignment between the first body frame and the second body frame, code for determining a compensation information based on an analysis of the one or more images, and code for determining a position based on one or more inertial sensors and the compensation information.

Implementations of such a non-transitory machine-readable medium may include one or more of the following features. The compensation information may include a displacement change and a pose change. The code for determining the compensation information based on the analysis of the one or more images may include code for identifying common features in the one or more images, code for calculating a rotation matrix based on the identified common features, and code for generating a pose change estimate based on the rotation matrix. The code for generating the pose change estimate based on the rotation matrix may include code for generating an uncertainty value. Detecting the change in alignment between the first body frame and the second body frame may include code for receiving information from an inertial sensor. The instructions may include code for synchronizing a detection of the change in alignment and the determining of the compensation information. The instructions may also include code for determining a first orientation between the first body frame and the second body frame, code for obtaining an initial first image with the image capture device, such that the initial first image is associated with the first orientation, and code for determining the compensation information based the analysis of the one or more images and the initial first image. The instructions may include code for outputting the compensation information to a navigation unit.

An example of an apparatus for determining alignment changes between a first body frame and a second body frame according to the disclosure includes means for obtaining one or more images from an image capture device associated with the first body frame in response to detecting a change in alignment between the first body frame and the second body frame, means for determining a compensation information based on an analysis of the one or more images, and means for determining a position based on one or more inertial sensors and the compensation information.

Implementations of such an apparatus may include one or more of the following limitations. The means for determining the compensation information may include a means for determining a displacement change and a means for determining a pose change. The analysis of the one or more images may include means for identifying common features in the one or more images, means for calculating a rotation matrix based on the identified common features, and means for generating a pose change estimate based on the rotation matrix. The apparatus may further include determining a first orientation between the first body frame and the second body frame, means for obtaining an initial first image with the image capture device, wherein the initial first image is associated with the first orientation, and means for determining the compensation information based the analysis of the one or more images and the initial first image. Detecting the change in alignment between the first body frame and the second body frame may include means for receiving information from an inertial sensor. The means for outputting the compensation information may include means for outputting the compensation information to an applications processor.

Items and/or techniques described herein may provide one or more of the following capabilities, and/or other capabilities not mentioned. A mobile device may be placed in a cradle, or other movable location, within a vehicle. A misalignment between a vehicle reference frame (i.e., v-frame) and the mobile device reference frame (i.e., b-frame) may be detected. GNSS positioning may be used to calibrate the misalignment. A time-tag may be created and stored when the misalignment is calibrated. The mobile device is configured to obtain a first image when the misalignment is calibrated. A front facing or rear facing camera on the mobile device may be used to obtain the image. The mobile device is placed into an INS state such that the inertial sensors in the mobile device may be used for positioning (e.g., dead reckoning). The mobile device may be subsequently reoriented, or moved, and a new misalignment between the v-frame and the b-frame is detected. A time-tag may be created and stored when the new misalignment is detected. The mobile device is configured to obtain a second image (e.g., with front or rear facing cameras) when the new misalignment is detected. Pose estimation is performed using common objects in the first and second images. The pose estimation information is used to compensate for the change of the misalignment and thus reduce the need to recalibrate for the new misalignment. The mobile device may continue in the INS state such that the inertial sensors continue to provide positioning information. The engagement rate of an INS system may increase, and the accuracy of the INS positioning information may be improved. A lengthy GNSS recalibration process may be avoided and battery power on the mobile device may be conserved. Other capabilities may be provided and not every implementation according to the disclosure must provide any, let alone all, of the capabilities discussed.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1A:
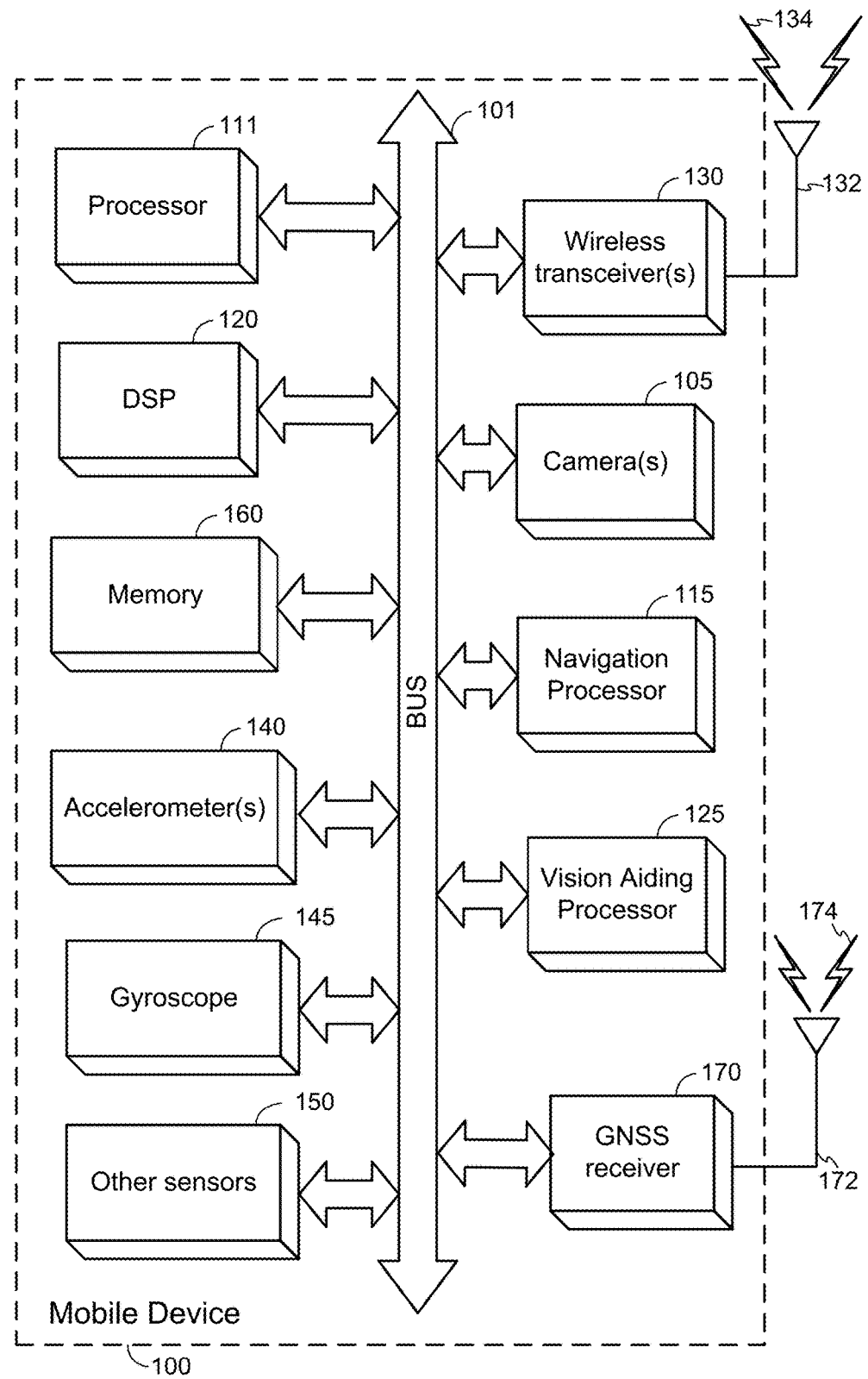
FIG. 1A is a block diagram of a mobile device that can be used to implement the techniques discussed herein.

Some example techniques are presented herein which may be implemented in various method and apparatuses in a mobile device to possibly provide for or otherwise support cradle rotation insensitive inertial navigation. Many vehicles (e.g., automobiles, bicycles, boats, recreational vehicles, etc.) include a cradle that is configured to secure a mobile device to the vehicle. These cradles, however, may allow the relative orientation between the mobile device and the vehicle to change over time. That is, the mechanical assembly within the cradle may be loose and allow the mobile device to move, or the cradle may be configured to allow the mobile device to be rotated, or otherwise adjusted, to improve the viewing angle for the user. In many GNSS and INS capable systems, a misalignment between a vehicle frame (e.g., v-frame) and a mobile body frame (b-frame) may be calibrated before the INS is engaged. Once calibrated, if the orientation between the v-frame and the b-frame changes, the INS will be disengaged and a recalibration sequence may be performed. Such a recalibration sequence may require additional use of GNSS positioning and the loss of the corresponding battery power required to activate the GNSS circuits.

In certain in-vehicle GNSS/INS navigation implementations, a misalignment between a mobile body frame (b-frame) and a vehicle frame (v-frame) is calibrated before an Inertial Navigation System (INS) is engaged. A mobile device, for in-vehicle GNSS/INS navigation purposes, is typically mounted in a cradle attached on dashboard, attached to a front windshield, attached to handlebars, or may just be placed in cup holder, on a seat, in a glove compartment, or worn by a user. Prior to the engagement of the INS navigation features, the misalignment needs to be determined with the help of GNSS. If a change in the misalignment is detected, the INS navigation features are typically disengaged until another GNSS calibration procedure is performed. The INS navigation capability on the mobile device is therefore susceptible to a subsequent change in the misalignment caused by cradle rotation, or other change in orientation of the mobile device relative to the vehicle. If, for example, the mobile device cradle is rotated while the vehicle is in motion, the INS may be disengaged, and the misalignment may be re-calibrated on-the-fly before the INS is reengaged. The calibration and re-calibration of the misalignment is generally subject to vehicle dynamics and GNSS signal conditions, and ultimately may be time consuming or may negatively affect an INS engagement rate. Further, a repetitive cycling of the INS navigation state from engaged to disengaged based on orientation changes can impact the power consumed by the mobile device (i.e., deplete the battery charge). The example techniques described herein enhance the traditional in-vehicle mobile INS navigation, such that that the enhanced system is less sensitive and less susceptible to impact caused by cradle rotation, and thus an increased INS engagement rate, a decrease of cycling between and engaged state and a disengaged state, and a decrease in power consumption may be realized.

Referring to FIG. 1A, a block diagram of a mobile device 100 that can be used to implement cradle insensitive inertial navigation techniques is shown. The mobile device 100 can include or implement the functionality of various mobile communication and/or computing devices; examples include, but are not limited to, in-vehicle navigation systems, wearable navigation devices, smartphones, wrist watches, helmet cameras, etc., whether presently existing or developed in the future. The mobile device 100 includes a processor 111 (or processor core), one or Digital Signal Processors (DSP) 120, and memory unit 160. The processor 111 may be a Central Processing Unit (CPU), a multi-core CPU, a Graphics Processing Unit (GPU), a multi-core GPU, a video engine, or any combination thereof. A processor core may be an applications processor. A navigation processor 115 and a vision aiding processor 125 are depicted within the mobile device 100 as an example only, and not a limitation. The navigation processor 115 and the vision aiding processor 125 may be included in the memory unit 160 and utilize the processor 111. The navigation processor 115 and/or the vision aiding processor 125 may be a System on Chip (SoC) within the mobile device (e.g., it may be dedicated hardware or may be a discrete chipset or part of a discrete chipset (e.g., on a discrete applications processor)), or may be included in an one or more auxiliary systems (e.g., remote from the mobile device 100). In one embodiment, the mobile device includes one or more cameras 105 (e.g., front and/or back facing) such as, for example, complementary metal-oxide-semiconductor (CMOS) image sensors with appropriate lens configurations. Other imaging technologies such as charge-coupled devices (CCD) and back side illuminated CMOS may be used. The cameras 105 are configured to obtain and provide image information to the vision aiding processor 125. In another embodiment, one or more external cameras may be used. For example, a vehicle may include installed cameras and the mobile device may be configured to process images obtained by those installed cameras to determine a misalignment.

The mobile device 100 may also include a wireless transceiver 130 configured to send and receive wireless signals 134 via a wireless antenna 132 over a wireless network. The wireless transceiver 130 is connected to a bus 101. Here, the mobile device 100 is illustrated as having a single wireless transceiver 130. However, a mobile device 100 can alternatively have multiple wireless transceivers 130 and wireless antennas 132 to support multiple communication standards such as Wi-Fi®, CDMA, Wideband CDMA (WCDMA), Long Term Evolution (LTE), Bluetooth® short-range wireless communication technology, etc.

The wireless transceiver 130 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc.

The mobile device 100 also includes a Global Navigation Satellite System (GNSS) receiver 170 that receives satellite positioning system (SPS) signals 174 (e.g., from SPS satellites) via an SPS antenna 172. The GNSS receiver 170 can communicate with a single global navigation satellite system (GNSS) or multiple such systems. A GNSS can include, but are not limited to, Global Positioning System (GPS), Galileo, Glonass, Beidou (Compass), etc. SPS satellites are also referred to as satellites, space vehicles (SVs), etc. The GNSS receiver 170 processes, in whole or in part, the SPS signals 174 and uses these SPS signals 174 to determine the location of the mobile device 100. The processor 111, DSP 120, and memory 16, and/or specialized processor(s) (not shown) may also be utilized to process the SPS signals 174, in whole or in part, and/or to calculate the location of the mobile device 100, in conjunction with GNSS receiver 170. Storage of information from the SPS signals 174 or other location signals is performed using a memory unit 160 or registers (not shown). A navigation processor 115 may comprise instructions configured to compute position information based on GNSS signals, and/or dead reckoning position information based on information receive from microelectromechanical systems (MEMS) such as the accelerometers 140, gyroscope 145, and/or other sensors 150 (e.g., pressure sensor, magnetometer, microphone). While only one processor 111, DSP 120, and a memory unit 160 are shown in FIG. 1A, more than one of any, a pair, or all of these components could be used by the mobile device 100.

The memory unit 160 can include a non-transitory machine-readable storage medium (or media) that stores functions as one or more instructions or code. Media that can make up the memory unit 160 include, but are not limited to, RAM, ROM, FLASH, disc drives, etc. In general, the functions stored by the memory unit 160 are executed by the processor 111, DSP 120, or other specialized processors. Thus, the memory unit 160 is a processor-readable memory and/or a computer-readable memory that stores software (programming code, instructions, machine code, etc.) configured to cause the processor 111 to perform the functions described. Alternatively, one or more functions of the mobile device 100 may be performed in whole or in part in hardware. The memory unit 160 may be communicatively coupled to the processor 111 via the bus 101. The term communicatively coupled describes the ability of components within the mobile device 100, or other systems, to exchange and process electronic signals.

A mobile device 100 can estimate its current position within an associated system using various techniques, based on other communication entities within view and/or information available to the mobile device 100. For instance, a mobile device 100 can estimate its position using information obtained from access points associated with one or more wireless local area networks (LANs), personal area networks (PANs) utilizing a short-range wireless communication technology such as Bluetooth® or ZigBee®, etc., SPS satellites, and/or map constraint data obtained from a map server or LCI server. The mobile device 100 may also estimate its current position based on dead reckoning techniques using inertial sensors such as the accelerometer 140, gyroscope 145 and other sensors 150 (e.g., magnetometer, pressure sensor, solid state compass). In an example, the mobile device 100 may determine a current position based, at least in part, on images obtained by the cameras 105 (e.g., by comparing current images to previously stored images). In general, the inertial sensors are used to measure the displacement of the mobile device 100. For example, the mobile device 100 may enter an INS state such that the navigation processor 115 is configured to receive signals from one or more inertial sensors (e.g., accelerometer, gyroscope, solid state compass) and compute a dead reckoning position. The dead reckoning position may be computed on a periodic basis and/or when course and speed information changes. In an example, the dead reckoning position may be adjusted when another position is determined (e.g., GNSS, trilateration, user input). For pedestrian applications, the accelerometers 140 may include a 3-axis accelerometer to drive a pedometer and determine a step count or step rate.

Figure 1B:
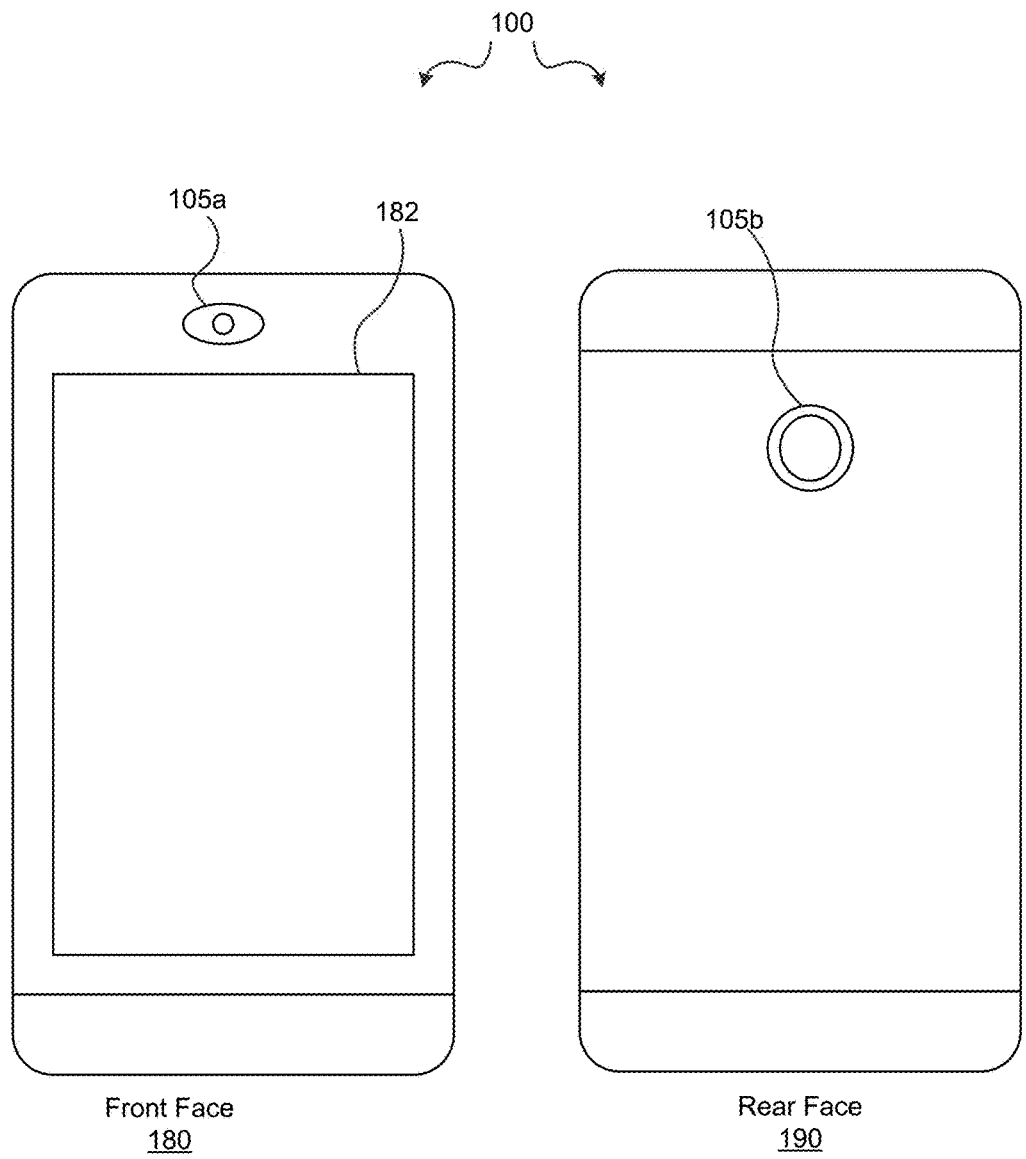
FIG. 1B is a perspective of a mobile device with front and rear facing cameras.

FIG. 1B is an illustration of a mobile device 100 operable to perform functions described herein. FIG. 1B may represent a smart phone using one or more components of the mobile device of FIG. 1A. However, the functionality described herein is not limited to using smart phones and may use any device with capabilities similar to FIG. 1A and suitable for performing such functionality. These devices may include mobile devices, digital cameras, camcorders, tablets, PDAs or any other similar device. FIG. 1B illustrates a front face 180 and rear face 190 of the mobile device 100. The front face 180 includes a display 182 and a first camera 105a. The first camera 105a is coupled to the front-facing side of the mobile device 100 is also referred to as a front-facing camera. The rear face 190 of the mobile device 100 includes a second camera 105b, also referred to herein as a rear-facing camera. The mobile device 100 may be held or mounted such that the front-facing camera 105a faces the user of the mobile device 100 and the rear-facing camera 105b faces away from the user of the device. Alternatively, the converse may be true depending on how the mobile device 100 is held by the user, or mounted in a cradle. Both the front-facing camera 105a and the rear-facing camera 105b may be an implementation of the camera(s) 105 and configured to provide image information to the vision aiding processor 125, as discussed with reference to FIG. 1A.

Figure 2:
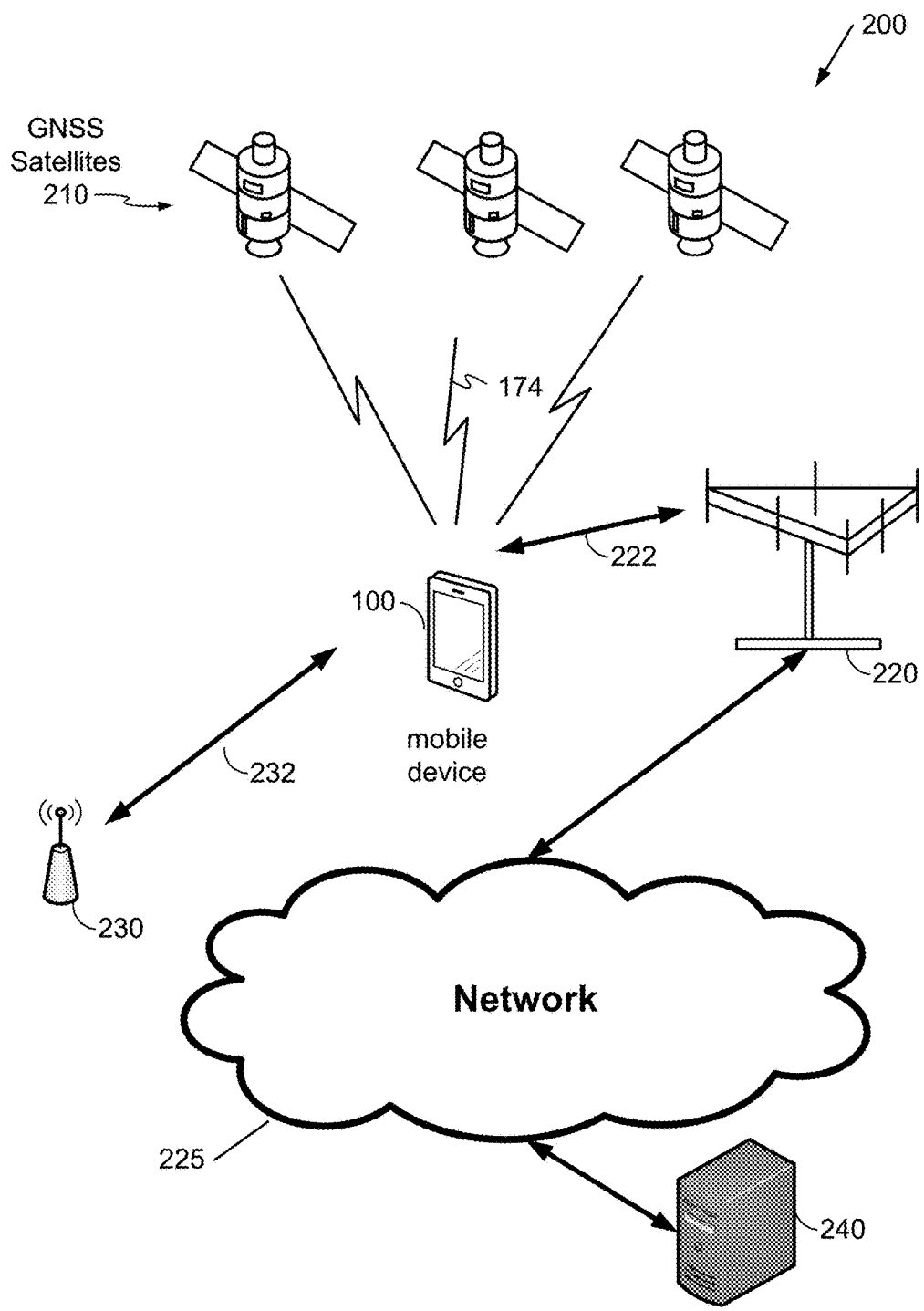
FIG. 2 is a block diagram of an example network architecture configured to communicate with the mobile device of FIGS. 1A and 1B.

Referring to FIG. 2, an example network architecture 200 configured to communicate with the mobile device of FIG. 1A is shown. The mobile device 100 may transmit radio signals to, and receive radio signals from, a wireless communication network. In one example, mobile device 100 may communicate with a cellular communication network by transmitting wireless signals to, or receiving wireless signals from a cellular transceiver 220 which may comprise a wireless base transceiver subsystem (BTS), a Node B or an evolved NodeB (eNodeB) over wireless communication link 222. Similarly, mobile device 100 may transmit wireless signals to, or receive wireless signals from local transceiver 230 over wireless communication link 232. A local transceiver 230 may comprise an access point (AP), femtocell, Home Base Station, small cell base station, Home Node B (HNB) or Home eNodeB (HeNB) and may provide access to a wireless local area network (WLAN, e.g., IEEE 802.11 network), a wireless personal area network (WPAN, e.g., Bluetooth® network) or a cellular network (e.g. an LTE network or other wireless wide area network such as those discussed in the next paragraph). Of course it should be understood that these are merely examples of networks that may communicate with a mobile device over a wireless link, and claimed subject matter is not limited in this respect.

Examples of network technologies that may support wireless communication link 222 are Global System for Mobile Communications (GSM), Code Division Multiple Access (CDMA), Wideband CDMA (WCDMA), Long Term Evolution LTE), High Rate Packet Data (HRPD). GSM, WCDMA and LTE are technologies defined by 3GPP. CDMA and HRPD are technologies defined by the 3rd Generation Partnership Project 2 (3GPP2). WCDMA is also part of the Universal Mobile Telecommunications System (UMTS) and may be supported by an HNB. Cellular transceivers 220 may comprise deployments of equipment providing subscriber access to a wireless telecommunication network for a service (e.g., under a service contract). Here, a cellular transceiver 220 may perform functions of a cellular base station in servicing subscriber devices within a cell determined based, at least in part, on a range at which the cellular transceiver 220 is capable of providing access service. Examples of radio technologies that may support wireless communication link 222 are IEEE 802.11, Bluetooth® and LTE.

In a particular implementation, cellular transceiver 220 and local transceiver 230 may communicate with one or more servers 240 over a network 225. Here, the network 225 may comprise any combination of wired and/or wireless links and may include cellular transceiver 220 and/or local transceiver 230 and/or servers 240. In a particular implementation, network 225 may comprise Internet Protocol (IP) or other infrastructure capable of facilitating communication between mobile device 100 and servers 240 through local transceiver 230 or cellular transceiver 220. In an implementation, network 225 may comprise cellular communication network infrastructure such as, for example, a base station controller or packet based or circuit based switching center (not shown) to facilitate mobile cellular communication with mobile device 100. In a particular implementation, network 225 may comprise local area network (LAN) elements such as WLAN APs, routers and bridges and may in that case include or have links to gateway elements that provide access to wide area networks such as the Internet. In other implementations, network 225 may comprise a LAN and may or may not have access to a wide area network but may not provide any such access (if supported) to mobile device 100. In some implementations the network 225 may comprise multiple networks (e.g., one or more wireless networks and/or the Internet). In one implementation, network 225 may include one or more serving gateways or Packet Data Network gateways. In addition, one or more of servers 240 may be an E-SMLC, a Secure User Plane Location (SUPL) Location Platform (SLP), a SUPL Location Center (SLC), a SUPL Positioning Center (SPC), a Position Determining Entity (PDE) and/or a gateway mobile location center (GMLC), each of which may connect to one or more location retrieval functions (LRFs) and/or mobility management entities (MMEs) in network 225.

In particular implementations, and as discussed below, mobile device 100 may have circuitry and processing resources capable of obtaining location related measurements (e.g. for signals received from GPS or other Satellite Positioning System (SPS) satellites 210, cellular transceiver 220 or local transceiver 230) and possibly computing a position fix or estimated location of mobile device 100 based on these location related measurements. In some implementations, location related measurements obtained by mobile device 100 may be transferred to a location server such as an enhanced serving mobile location center (E-SMLC) or SUPL location platform (SLP) (e.g. which may be one of the one or more servers 240) after which the location server may estimate or determine a location for mobile device 100 based on the measurements. In the presently illustrated example, location related measurements obtained by mobile device 100 may include measurements of SPS signals 174 received from satellites belonging to an SPS or Global Navigation Satellite System (GNSS) such as GPS, GLONASS, Galileo or Beidou and/or may include measurements of signals (such as 222 and/or 232) received from terrestrial transmitters fixed at known locations (e.g., such as cellular transceiver 220). Mobile device 100 or a separate location server may then obtain a location estimate for mobile device 100 based on these location related measurements using any one of several position methods such as, for example, GNSS, Assisted GNSS (A-GNSS), Advanced Forward Link Trilateration (AFLT), Observed Time Difference Of Arrival (OTDOA) or Enhanced Cell ID (E-CID) or combinations thereof. In some of these techniques (e.g. A-GNSS, AFLT and OTDOA), pseudoranges or timing differences may be measured at mobile device 100 relative to three or more terrestrial transmitters fixed at known locations or relative to four or more satellites with accurately known orbital data, or combinations thereof, based at least in part, on pilots, positioning reference signals (PRS) or other positioning related signals transmitted by the transmitters or satellites and received at mobile device 100. Doppler measurements may be made to various signal sources such as the cellular transceiver 220, the local transceiver 230, and satellites 210, and various combinations therein. The one or more servers 240 may be capable of providing positioning assistance data to mobile device 100 including, for example, information regarding signals to be measured (e.g., signal timing), locations and identities of terrestrial transmitters and/or signal, timing and orbital information for GNSS satellites to facilitate positioning techniques such as A-GNSS, AFLT, OTDOA and E-CID. For example, the one or more servers 240 may comprise an almanac which indicates locations and identities of cellular transceivers and/or local transceivers in a particular region or regions such as a particular venue, and may provide information descriptive of signals transmitted by a cellular base station or AP such as transmission power and signal timing. In the case of E-CID, a mobile device 100 may obtain measurements of signal strengths for signals received from cellular transceiver 220 and/or local transceiver 230 and/or may obtain a round trip signal propagation time (RTT) between mobile device 100 and a cellular transceiver 220 or local transceiver 230. A mobile device 100 may use these measurements together with assistance data (e.g. terrestrial almanac data or GNSS satellite data such as GNSS Almanac and/or GNSS Ephemeris information) received from the one or more servers 240 to determine a location for mobile device 100 or may transfer the measurements to the one or more servers 240 to perform the same determination. In an embodiment, the server 240 may include a vision aiding processor configured to receive image information from the mobile device and to perform the feature analysis and pose estimation and described herein.

A mobile device (e.g. mobile device 100 in FIG. 1A) may be referred to as a device, a wireless device, a mobile terminal, a terminal, a mobile station (MS), a user equipment (UE), a SUPL Enabled Terminal (SET) or by some other name and may correspond to a cellphone, smartphone, wrist watch, in-vehicle navigation system, tablet, PDA, tracking device or some other portable or moveable device. Typically, though not necessarily, a mobile device may support wireless communication such as using GSM, WCDMA, LTE, CDMA, HRPD, Wi-Fi®, BT, WiMax, etc., A mobile device may also support wireless communication using a wireless LAN (WLAN), DSL or packet cable for example. A mobile device may comprise a single entity or may comprise multiple entities such as in a personal area network where a user may employ audio, video and/or data I/O devices and/or body sensors and a separate wireline or wireless modem. An estimate of a location of a mobile device (e.g., mobile device 100) may be referred to as a location, location estimate, location fix, fix, position, position estimate or position fix, and may be geographic, thus providing location coordinates for the mobile device (e.g., latitude and longitude) which may or may not include an altitude component (e.g., height above sea level, height above or depth below ground level, floor level or basement level). Alternatively, a location of a mobile device may be expressed as a civic location (e.g., as a postal address or the designation of some point or small area in a building such as a particular room or floor). A location of a mobile device may also be expressed as an area or volume (defined either geographically or in civic form) within which the mobile device is expected to be located with some probability or confidence level (e.g., 67% or 95%). A location of a mobile device may further be a relative location comprising, for example, a distance and direction or relative X, Y (and Z) coordinates defined relative to some origin at a known location which may be defined geographically or in civic terms or by reference to a point, area or volume indicated on a map, floor plan or building plan. In the description contained herein, the use of the term location may comprise any of these variants unless indicated otherwise.

Figure 3:
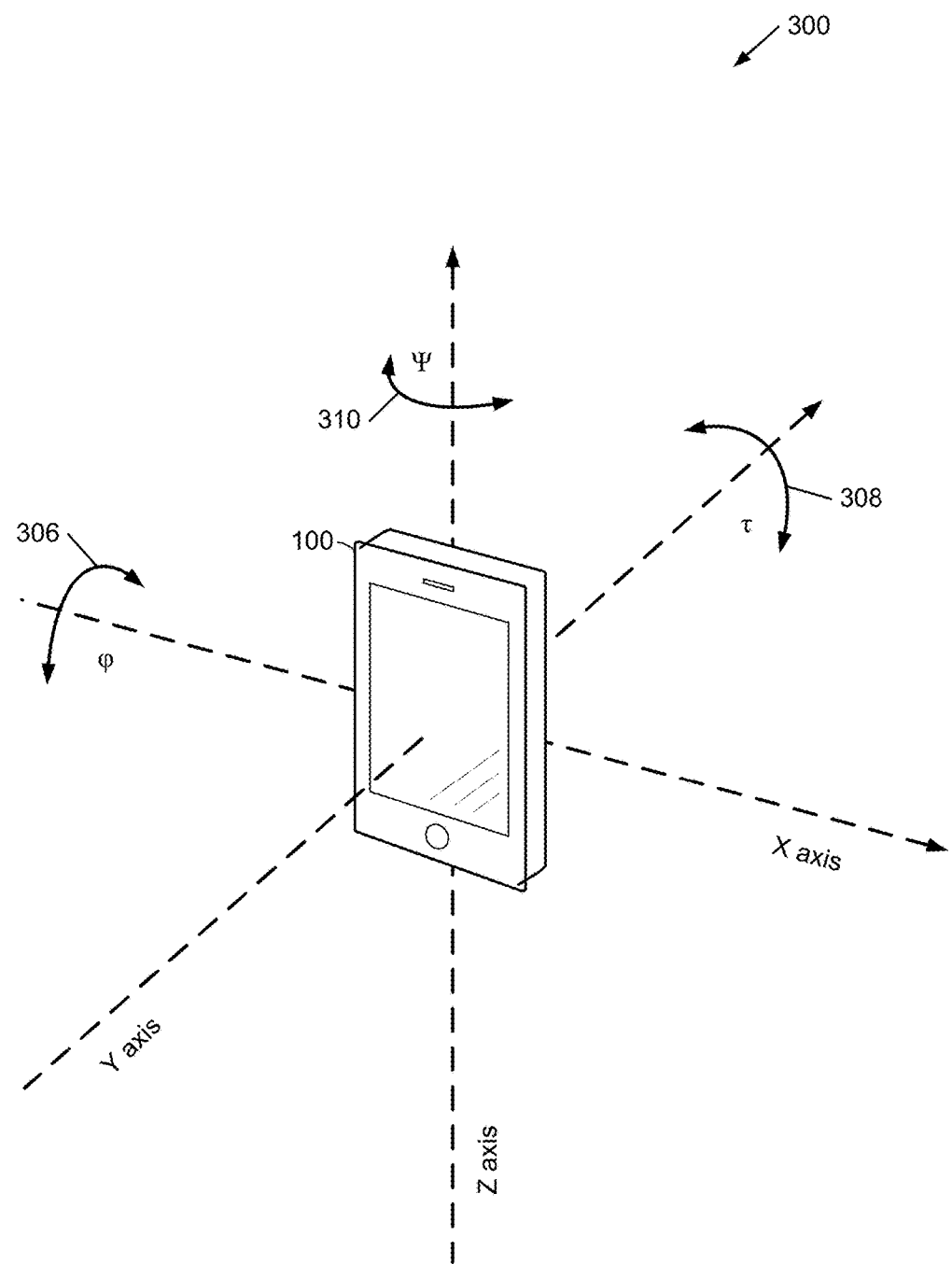
FIG. 3 is an example coordinate system that may be applied to a mobile device.

Referring to FIG. 3, with further reference to FIGS. 1A and 1B, an example coordinate system 300 that may be used, in whole or in part, to facilitate or support measurements obtained via inertial sensors of a mobile device 100 is shown. Inertial sensor measurements may be obtained based, at least in part, on output signals generated by an associated accelerometer 140 or gyroscope 145, for example. An example coordinate system 300 may comprise, for example, three-dimensional Cartesian coordinate system. The displacement of a mobile device 100 representing, for example, acceleration vibration may be detected or measured, at least in part, by a suitable accelerometer, such as a three-dimensional (3D) accelerometer, for example, with reference to three linear dimensions or axes X, Y, and Z relative to the origin of example coordinate system 300. It should be appreciated that example coordinate system 300 may or may not be aligned with a body of mobile device 100. In an implementation a non-Cartesian coordinate system may be used or that a coordinate system may define dimensions that are mutually orthogonal.

At times, rotational motion of mobile device 100, such as orientation changes about gravity, for example, may be detected or measured, at least in part, by a suitable accelerometer with reference to one or two dimensions. For example, in some instances, rotational motion of mobile device 100 may be detected or measured in terms of coordinates ($\varphi$ (phi), $\tau$ (tau)), where phi ($\varphi$) represents roll or rotation about an X axis, as illustrated generally by arrow at 306, and tau ($\tau$) represents pitch or rotation about an Y axis, as illustrated generally at 308. As discussed below, rotational motion of mobile device 100 may also be detected or measured by a suitable gyroscope, such as, for example, with respect to X, Y, and Z orthogonal axes. Accordingly, a 3D accelerometer may detect or measure, at least in part, a level of acceleration vibration as well as a change about gravity with respect to roll or pitch dimensions, for example, thus, providing five dimensions of observability (X, Y, Z, $\varphi$, $\tau$). Of course, these are merely examples of motions that may be detected or measured, at least in part, with reference to example coordinate system 300, and claimed subject matter is not limited to particular motions or coordinate system.

In an example, the rotational motion of the mobile device 100 may be detected or measured, at least in part, by a suitable gyroscope 145 so as to provide adequate or suitable degrees of observability. The gyroscope 145 may detect or measure rotational motion of the mobile device 100 with reference to one, two, or three dimensions. Thus, in some instances, gyroscopic rotation may, for example, be detected or measured, at least in part, in terms of coordinates ($\varphi$, $\tau$, $\Psi$), where phi ($\varphi$) represents roll or rotation 306 about an X axis, tau ($\tau$) represents pitch or rotation 308 about an Y axis, and psi ($\psi$) represents yaw or rotation about a Z axis, as referenced generally at 310. A gyroscope may typically, although not necessarily, provide measurements in terms of angular acceleration (e.g., a change in an angle per unit of time squared), angular velocity (e.g., a change in an angle per unit of time), or the like. Likewise, here, details relating to motions that may be detected or measured, at least in part, by a gyroscope with reference to the example coordinate system 300 are merely examples, and claimed subject matter is not so limited.

Figure 4:
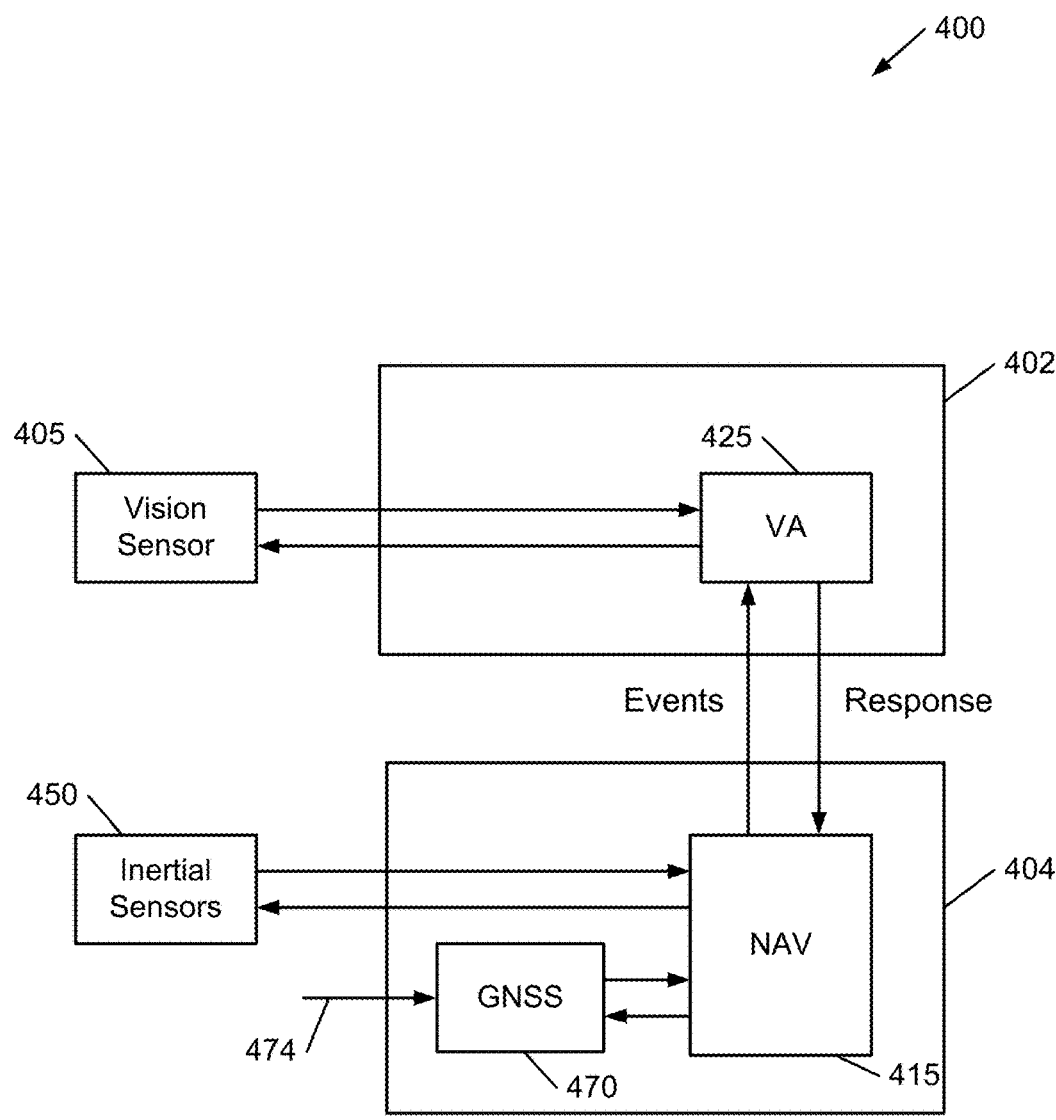
FIG. 4 is a block diagram of an example of a distributed system for implementing cradle rotation insensitive INS.

Referring to FIG. 4, a block diagram of an example of a distributed system 400 for implementing cradle insensitive INS is shown. The distributed system includes an auxiliary processor (AP) 402 and a main processor (MP) 404. The AP 402 is operably connected to the MP 404, and is configured to respond to indications of events received from the MP 404. In general, the AP 402 is configured to provide image analysis information such as pose estimation based on information received from a vision sensor 405. The vision sensor 405 may be a CMOS imaging technology such as the cameras 105 in FIG. 1A. The AP 402 includes a vision aiding processor (VA) 425 operably connected to the vision sensor 405 and configured to activate the vision sensor 405 and receive image information. The MP 404 includes a navigation processor (NAV) 415 operably coupled to a GNSS processor 470. Inertial sensors 450 are configured to receive commands from the navigation processor 415 and return inertial data such as output by accelerometers and gyroscopes. The GNSS processor 470 is configured to receive satellite positioning signals 474 and provide position information to the navigation processor 415. Other positioning methods may be used to provide position information. For example, the mobile device 100 or a separate server 240, may obtain a location estimate for mobile device 100 based on Assisted GNSS (A-GNSS), Advanced Forward Link Trilateration (AFLT), Observed Time Difference Of Arrival (OTDOA) or Enhanced Cell ID (E-CID). In embodiment, the AP 402, the MP 404, vision sensor 405, and inertial sensors 450 may be included within a single device, such as the mobile device 100. In another embodiment, as depicted in FIG. 4, the AP 402, the MP 404, vision sensor 405, and inertial sensors 450 may be included in separate devices and configured to exchange information via wired or wireless communication paths. In an example, the vision sensor 405 may be installed in a fixed position with respect to a vehicle frame. A mobile device, including inertial sensors, may be mounted in a cradle in the vehicle such that the orientation of the mobile device may vary with respect to the vehicle frame. The vision sensor 405 may be disposed within the vehicle such that images of the cradled mobile device may be obtained. That is, the vision sensor 405 and the vision aiding processor 425 may be configured to compute pose estimation information for the mobile device and thus detect displacement and/or orientation changes (e.g., X, Y, Z, $\varphi$, $\tau$, $\psi$).

Figure 5A:
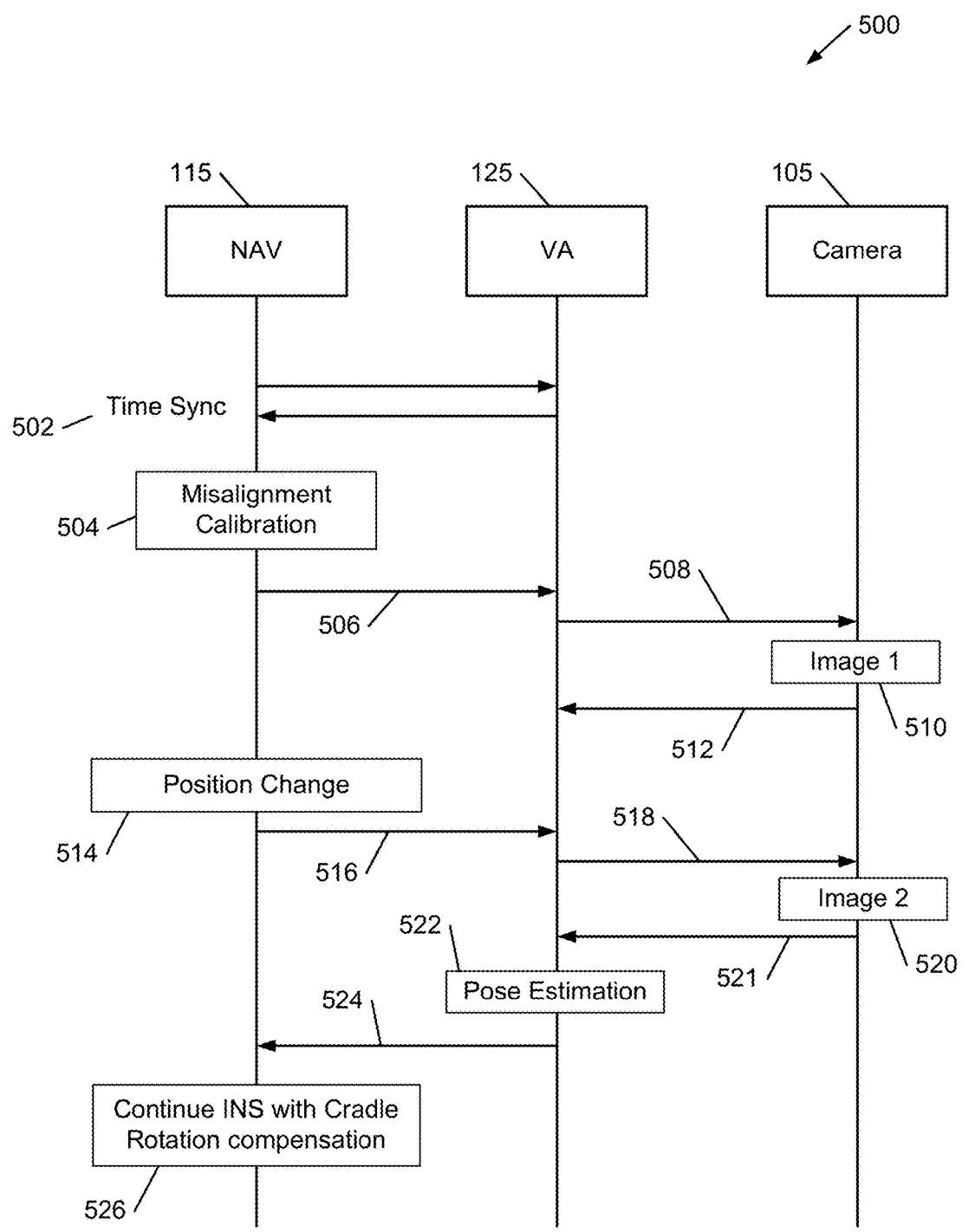
FIG. 5A is an example message flow diagram for implementing cradle rotation compensation with a first and a second images.

Referring to FIG. 5A, with further reference to FIGS. 1A, 1B, 2, and 3, an example message flow diagram 500 for implementing cradle rotation compensation is shown. The message flow diagram 500 includes the information flow between the navigation processor 115, the vision aiding (VA) processor 125, and the camera(s) 105. In an example, the navigation processor 115, the vision aiding processor 125 and the camera(s) 105 are included in the mobile device 100 and information may be communicated via the bus 101. In an embodiment, the navigation processor 115 and the vision aiding processor 125 may be disposed in separate hardware elements (e.g., AP 402, MP 404) with separate processors and may be configured to exchange information via wired and/or wireless links. The navigation processor 115 and the vision aiding processor 125 are configured to exchange one or more time synchronization signal messages 502 on a periodic basis, or based on a triggering event (e.g., the completion of misalignment calibration, or a detection of the change in misalignment). Typically, the navigation processor 115 receives time updates via the SPS signals 174 and provides the time information to the vision aiding processor 125 via the time synchronization signal messages 502. The time synchronization signal messages 502 enable synchronization of the detection of a change in the misalignment calibration. The time synchronization signal messages 502 may also be utilized to initiate generating a pose change estimate.

At stage 504, the navigation processor 115 is configured to determine a misalignment calibration between a first body frame and a second body frame. In an example, the first body frame is the vehicle frame (v-frame) and the second body frame is a mobile body frame (b-frame). The mobile body may be a mobile device 100, and the mobile frame may be aligned with one or more cameras 105. The misalignment calibration determined at stage 504 represents the initial misalignment or orientation between the v-frame and the b-frame. The misalignment calibration is generally determined over a period of time by comparing the position information derived from the GNSS signals and the corresponding INS positions. That is, navigation processor 115 is configured to compare a series of navigation fixes determined with the GNSS receiver 170 with corresponding dead reckoning position obtained via the inertial sensors. The processor 111 is a means for determining a misalignment calibration. For example, the misalignment calibration may be a rotation matrix based on the GNSS and INS position information. When the misalignment calibration is complete, the navigation processor 115 is configured to send calibration complete message 506 to the vision aiding processor 125. The calibration complete message 506 may include a time-tag (e.g., indicating the current system time) and an event tag (e.g., indicating the message as the calibration complete message). Other information such as a current location, heading and speed may optionally be included.

The vision aiding processor 125 is configured to receive the calibration complete message 506 and obtain an image with the camera 105. If the mobile device 100 includes two cameras (e.g., a front-facing camera 105a and a rear-facing camera 105b), the vision aiding processor is configured to select one of the cameras to obtain the image. The criteria for selecting a camera may include determining if the lens is obstructed (e.g., no image information available), proper exposure (e.g., the lens is not receiving direct light), or image quality (e.g., one or more high contrast areas). The vision aiding processor 125 may issue a trigger, such as an obtain first image trigger 508, to instruct the camera 105 to obtain a first image at stage 510. The first image (i.e., an initial image) may be of the interior of the vehicle and can be used to memorialize the orientation between the vehicle and the mobile device. In an example, the first image may be of the exterior of the vehicle (e.g., looking out the windshield) and may capture one or more fixed objects associated with the vehicle such as the hood line, windshield frame, hood ornament, antennas, etc. In another example, the camera 105 is external of the mobile device 100 and the first image captures the relative orientation of the mobile device (e.g., as compared to the fixed camera). The camera is configured to provide the first image information 512 to the vision aiding processor 125 for storage and subsequent processing. The first image information 512 includes the image data and may optionally include image metadata such as the date, time, which camera was used, and camera settings (e.g., gain, offset, focal length). The vision aiding processor 125 may be configured to perform image processing on the first image, such as image segmentation and area/object detection. The first image information 512 may be stored in the memory unit 160, or may be stored locally in the vision aiding processor (e.g., in the AP 402).

At stage 514, the navigation processor 115 is configured to detect a position change event. In an example, the inertial sensors in the mobile device 100 may detect a reconfiguration event such as rotation about the Y-axis ($\tau$) due to a change from portrait to landscape orientation. Other rotation events (e.g., $\varphi$, $\Psi$) and displacement change events (e.g., X, Y, Z) may also be detected. For example, a user may relocate the mobile device 100 from the dash board to a cup holder. The rotation and displacement change events need not be drastic. Subtle changes (e.g., less than a 90 orientation change) may be detected. That is, minor changes in the orientation of the cradle (e.g., due to gravity, vehicle motion, etc.) may be detected. In another example, a cradle rotation event may be deemed detected based on the passage of time. That is, the misalignment calibration may be verified on a periodic basis as measured from the time the misalignment calibration was last completed.

The navigation processor 115 is configured to send a position change message 516 to the vision aiding processor 125. The position change message 516 may include a time-tag, event identification, and details of the detected cradle rotation. For example, the details may include the amount of a rotation(s) (e.g., $\varphi$, $\tau$, and/or $\Psi$), an error value (e.g., a distance between GNSS and INS calculated positions), and/or the time elapsed since the misalignment calibration). The vision aiding processor 125 is configured to send an obtain second image trigger 518 to the camera 105.

At stage 520, the camera 105 obtains a second image. The second image will be compared to the first image and hence the same camera (e.g., front facing, rear facing) should be utilized. The camera provides the second image information 521 to the vision aiding processor 125 for pose estimation processing.

At stage 522, the vision aiding processor 125 is configured to determine pose estimation information based on the first image (i.e., obtained at stage 510) and the second image (i.e., obtained at stage 520). The vision aiding processor 125 may utilize the processor 111 to perform image analysis on the first and second images. The image analysis may include segmentation and feature recognition. In an embodiment, the vision aiding processor 125 is configured to identify features in the image (i.e., image recognition). Identifying features in the image may also be performed remotely (e.g., on the server 240). The features may include high contrast areas in the respective image such as window lines, overhead lights, seatbacks, or other common features in the images that may be used to compare the relative locations of common features in each of the images. The pose change estimate may include a rotation matrix based on the relative pixel locations of common features in the first and second image. The rotation matrix identifies the change in orientation of the mobile body relative to the vehicle (e.g., as caused by the position change event detected at stage 514). In an example, the pose change estimate may include an uncertainty value based on low image quality, relative positions of features, or other deviations induced by multiple axis movement. The uncertainty may be due to inconsistent calculations of the feature dimensions in the first and second images (e.g., a correspondence problem). Other pose estimation and image analysis techniques may be used to derive a rotation matrix and an uncertainty value. The vision aiding processor 125 sends a pose information message 524 to the navigation processor 115. The pose information message 524 may include the rotation matrix, uncertainty value, or other pose information to be used by the navigation processor 115 to modify the misalignment calibration.

At stage 526, the navigation processor 115 is configured to propagate and apply the pose information included in the pose information message 524, and to continue with the INS navigation. For example, the misalignment calibration determined at stage 504 may be modified by the rotation matrix and uncertainty value included in the pose information message 524. As a result, the adaptability and continuity, as well as the navigation accuracy, of the INS navigation system may be increased.

Figure 5B:
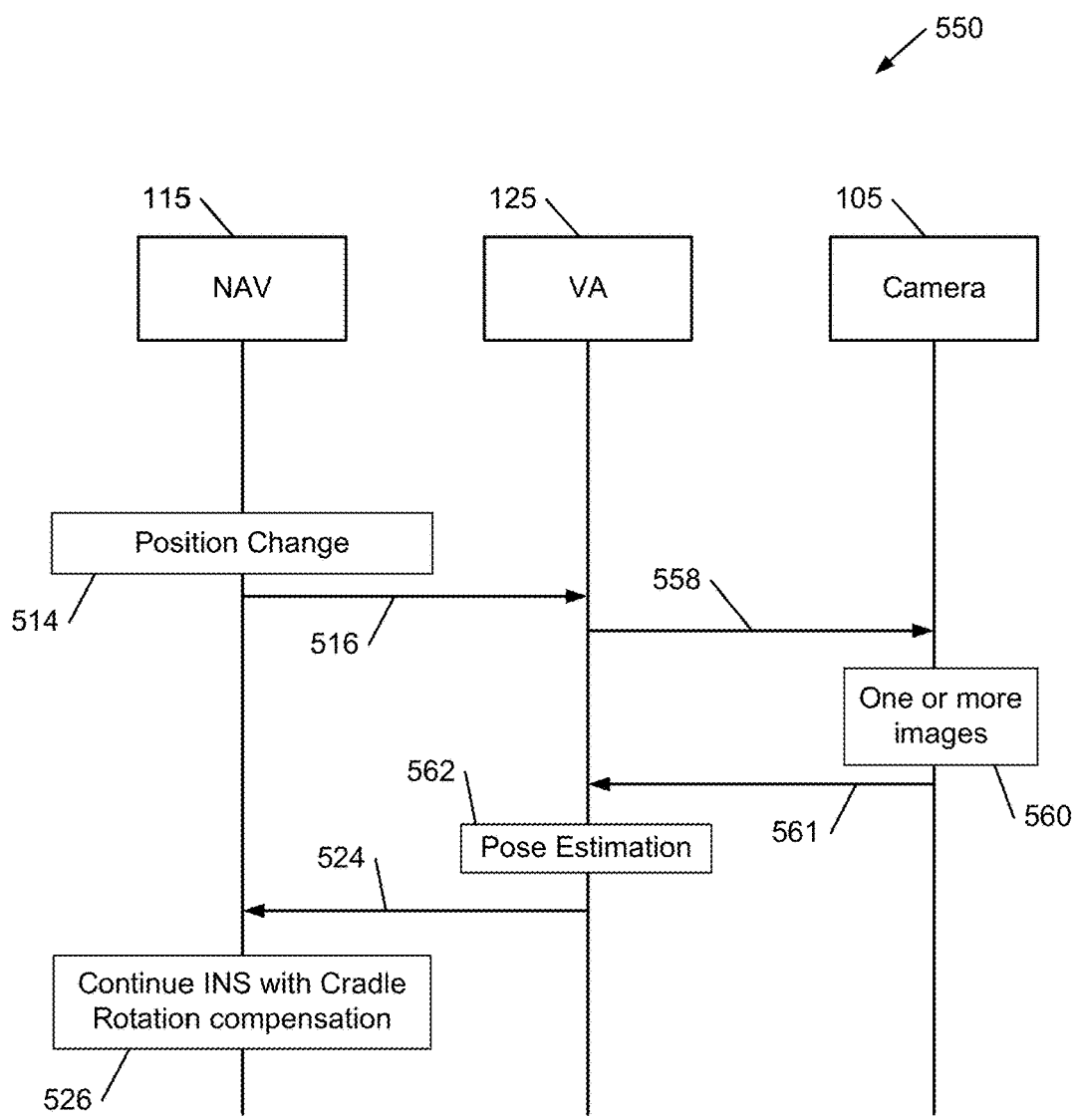
FIG. 5B is an example message flow diagram for implementing cradle rotation compensation with one or more images.

Referring to FIG. 5B, with further reference to FIGS. 1A, 1B, 2, 3, and 5A an example message flow diagram 550 for implementing cradle rotation compensation with one or more images is shown. The message flow diagram 550 includes the information flow between the navigation processor 115, the vision aiding (VA) processor 125, and the camera(s) 105. In an example, the navigation processor 115, the vision aiding processor 125 and the camera(s) 105 are included in the mobile device 100 and information may be communicated via the bus 101. In an embodiment, the navigation processor 115 and the vision aiding processor 125 may be disposed in separate hardware elements (e.g., AP 402, MP 404) with separate processors and may be configured to exchange information via wired and/or wireless links. The navigation processor 115 is configured to detect a position change event at stage 514 and previously described. The inertial sensors in the mobile device 100 may detect a position change event such as rotation events (e.g., $\varphi$, $\Psi$) and/or displacement events (e.g., X, Y, Z). For example, both rotation and displacement events may occur when a user picks up a mobile device to read a map, or listen to a telephone call. In an example, the GNSS may detect the position change event based on changing signal strengths or position calculations. The navigation processor 115 is configured to send a position change message 516 to the vision aiding processor 125. The position change message 516 may include a time-tag, event identification, and details of the detected cradle rotation. For example, the details may include the amount of a rotation(s) (e.g., φ, τ, and/or Ψ), an error value (e.g., a distance between GNSS and INS calculated positions), and/or the time elapsed since the misalignment calibration. The vision aiding processor 125 is configured to send an obtain one or more images trigger 558 to the camera 105. At stage 560, the camera 105 obtains one or more images. The camera provides the one or more image information 561 to the vision aiding processor 125 for pose estimation processing.

At stage 562, the vision aiding processor 125 is configured to determine pose estimation information based on the one or more images obtained at stage 560. The vision aiding processor 125 may utilize the processor 111 to perform image analysis on the one or more images. The image analysis may include identifying features in the one or more images, calculating a rotation matrix based on the identified features, and generating a pose change estimate based on the rotation matrix. As previously described, identifying features in the image may be performed locally, or remotely (e.g., on the server 240). The features may include features with known, or estimated, orientations such as horizontal and vertical high contrast areas (e.g., hood line, rear window frame, seat back outline). The orientation of the features may be determined from a previously obtained image and stored in a non-image format (e.g., binary feature file). In an example, the known features may be based on one or more previously stored images (e.g., a single calibration image that is associated with a vehicle). An uncertainty may be due to inconsistent determination of the feature orientations and/or dimensions. Other pose estimation and image analysis techniques may be used to derive a rotation matrix and an uncertainty value from the one or more images. The vision aiding processor 125 sends a pose information message 524 to the navigation processor 115. The pose information message 524 may include the rotation matrix, uncertainty value, or other pose information to be used by the navigation processor 115 to modify the misalignment calibration.

Figure 6:
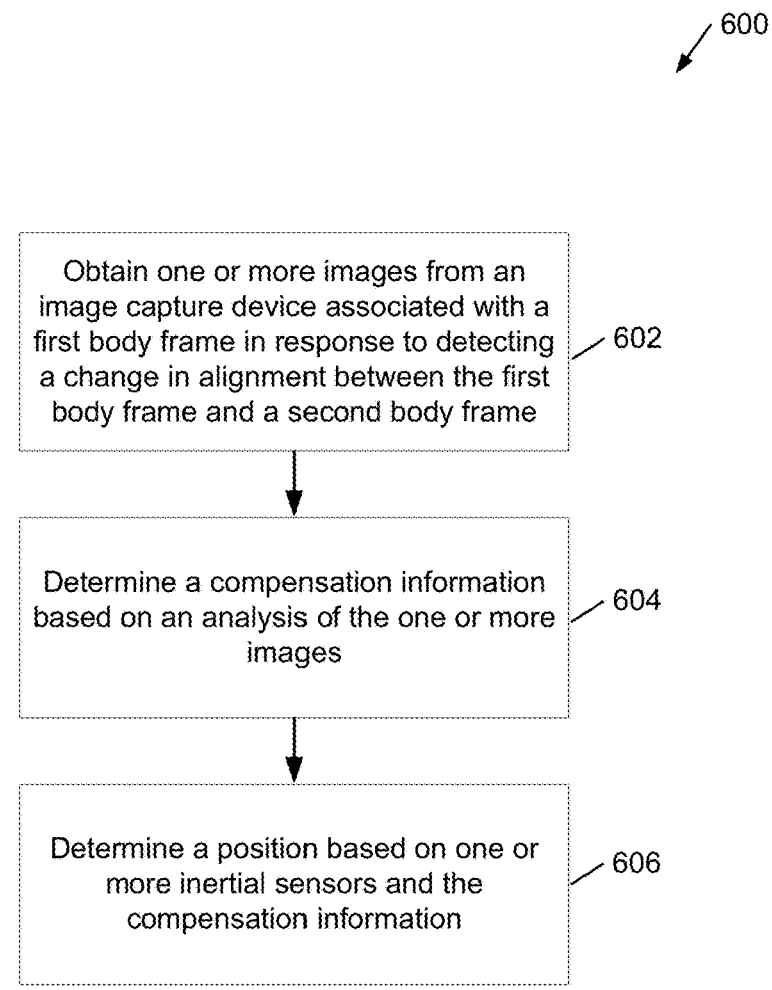
FIG. 6 is a flow diagram of a process for compensating for a change in a misalignment calibration.

Referring to FIG. 6, with further reference to FIGS. 1A-5B, a process 600 for compensating for a change in a misalignment calibration includes the stages shown. The process 600 is, however, an example only and not limiting. The process 600 can be altered, e.g., by having stages added, removed, rearranged, combined, performed concurrently, and/or having single stages split into multiple stages.

At stage 602 an image capture device is configured obtain one or more images associated with a first body frame in response to detecting a change in alignment between the first body frame and a second body frame. In an example, the vision sensor 405 is an image capture device and a means for obtaining one or more images. The vision sensor 405 may receive a trigger signal from the vision aiding processor 425 in response, for example, to a cradle rotation event. In an example, the first body frame may be the b-frame (e.g., associated with mobile device) and the image may include one or more features which are fixed in relation to the v-frame. In another example, the first body frame may be the v-frame (i.e., a fixed vehicle camera) and the image may include the orientation of a cradled mobile device. The image may have a resolution based on a corresponding optical path (e.g., lens) and processing capability (e.g., a value of 1.3 megapixels or higher is typical). The one or more images image obtained a stage 602 may be compared to a previously stored image from approximately the same perspective in an effort to detect pose and/or displacement changes of objects/features within the image. The features in the one or more images may be compared to information derived from one or more previously obtained images of the first body frame. For example, an initial first image such as a single "set-up" or calibration image of the interior of a vehicle may be obtained and stored for future reference. Subsequent images may be compared to such a calibration image.

At stage 604 the vision aiding processor 425 is configured to determine a compensation information based on an analysis of the one or more images. For example, the processor 111 in the mobile device 100 may be a means for determining compensation information. In an example, an initial misalignment calibration may be determined when the navigation features on the mobile device are activated. The misalignment calibration accounts for the orientation difference between the first body frame (e.g., the b-frame) and the second body frame (e.g., the v-frame). As previously described, the misalignment calibration may be determined from GNSS position information and dead reckoning data derived from the inertial sensors. When the misalignment calibration was completed, the image capture device obtained and stored an image file. The previously stored image file and the image obtained at stage 602 are compared. The vision aiding processor 425 may include instructions configured to cause the processor 111, or other processors, to perform image analysis and pose estimation on the images. The pose and alignment information obtained from processing the images represents the change in the misalignment calibration. For example, the change may be indicated as a rotation matrix, and possibly an uncertainty value, derived from the images. In an example, the processor 111 may be a means for calculating the rotation matrix and the uncertainty value (e.g., local image processing). In another example, the server 240 may be configured to receive image files from the mobile device 100 and return the rotation matrix and uncertainty value (e.g., remote image processing). The navigation processor 415 and one or more processors (e.g., the mobile device 100 processor 111) are a means to determine compensation information. The navigation processor 415 is configured to receive the pose and alignment information from the vision aiding processor 425. For example, the vision aiding processor 425 may output a rotation matrix and an uncertainty value based on the image analysis. The image analysis may include identifying common features in one or more images, calculating a rotation matrix based on the common features, and generating a pose change estimate based on the rotation matrix. The navigation processor 415 may be configured to generate a new compensation matrix based on the misalignment calibration and the received rotation matrix.

At stage 606, the navigation processor 115 is configured to determine a position based on the compensation information and one or more inertial sensors. For example, the accelerometer 140, gyroscope 145, and/or other sensors 150 may provide inertial information to the navigation processor 115. The compensation information may be applied to the inertial sensor signals (i.e., as received by the navigation processor 115) to generate dead-reckoning position estimates. In an embodiment, the compensation information may be output to an application process or other navigation unit for subsequent use in dead reckoning calculations or other location based services.

Figure 7:
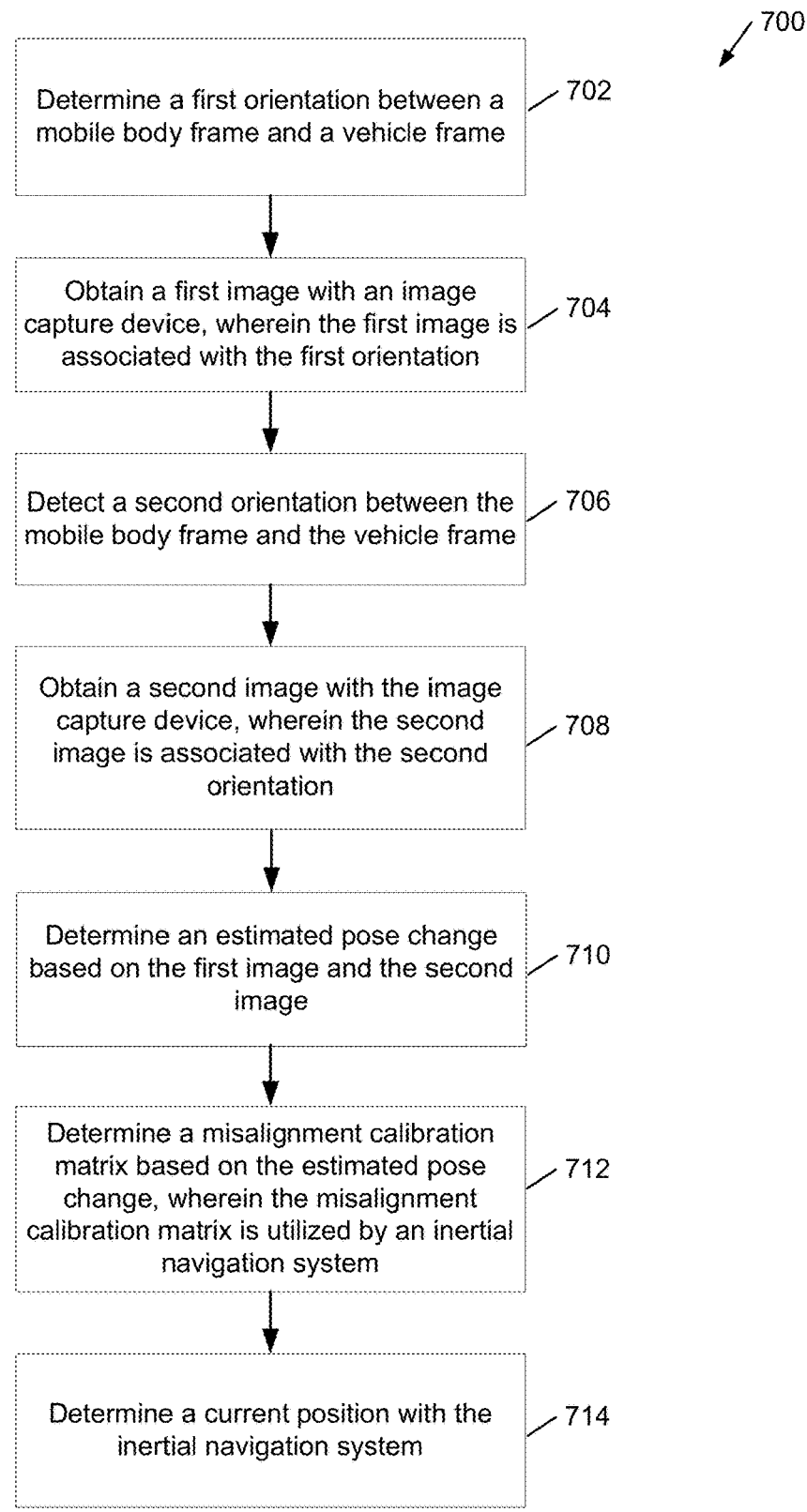
FIG. 7 is a flow diagram of a process for determining a current position with an inertial navigation system.

Referring to FIG. 7, with further reference to FIGS. 1A-5, a process 700 for determining a current position with an inertial navigation processor includes the stages shown. The process 700 is, however, an example only and not limiting. The process 700 can be altered, e.g., by having stages added, removed, rearranged, combined, performed concurrently, and/or having single stages split into multiple stages.

At stage 702, the mobile device 100 is configured to determine a first orientation between a mobile body frame and a vehicle frame. In an example, the mobile device 100 may be installed in a cradle within a vehicle and the navigation capabilities activated. The mobile device includes an INS with inertial sensors (e.g., accelerometers 140), and a GNSS receiver 170. Upon activation of the navigation capabilities, for example, the mobile device 100 may calculate GNSS based position information and compare the results to the position information calculated by the INS. The processor 111 is a means for determining a first orientation. For example, the respective GNSS/INS position information may be analyzed to determine a first rotation matrix based on the orientation of the mobile device 100 in the cradle as compared to the vehicle movement.

At stage 704, the mobile device 100 is configured to obtain a first image with an image capture device, such that the first image is associated with the first orientation. The camera(s) 105 are a means for obtaining a first image. After the first orientation is determined at stage 702, the mobile device 100 may be configured to obtain an image of the surrounding area. If the mobile device 100 includes multiple cameras (e.g., front facing 105a, rear facing 105b), each of the cameras may obtain an image which would collectively make the first image. In another example, the mobile device can analyze the image quality for each of the respective cameras and select one. The obtained image may be stored in the memory unit 160. In an example, the first image may be associated with the first orientation based on a time-tag or other indexing system to indicate that the first image is a record of the first orientation between the mobile device 100 and the vehicle (e.g., automobile, bicycle, boat, recreational vehicle, etc.).

At stage 706, the mobile device 100 is configured to detect a second orientation between the mobile body frame and the vehicle frame. In an example, the navigation processor 115 and the inertial sensors in the mobile device are a means for detecting the second orientation. That is, the inertial sensors may detect when the cradle is rotated or otherwise displaced. In other example, the second orientation may be detected as an error between a periodic GNSS position and the respective INS position. The INS position calculations incorporate the first orientation and a threshold value may be established to indicate a possible change to the first orientation. A violation of the threshold value (e.g., exceeding the distance) is an option for detecting a second orientation.

At stage 708, the mobile device 100 is configured to obtain a second image with the image capture device, such that the second image is associated with the second orientation. The camera(s) 105 are a means for obtaining a second image. In an example, the mobile device 100 is configured to utilize the same camera (or cameras) used to obtain the first image at stage 704. The first image may include metadata to indicate image parameters (e.g., gain, offset) which may be used to obtain the second image. The second image may be stored in the memory unit 160 for subsequent image analysis. In an example, the second image may be associated with the second orientation based on a time-tag or other indexing system to indicate that the second image is a record of the second orientation between the mobile device 100 and the vehicle.

At stage 710, the processor 111 in the mobile device 100 is configured to determine an estimated pose change based on the first image and the second image. The vision aiding processor 125 includes instructions to configure the processor 111, or other processors (not shown), to perform an image analysis on the first and second images to determine the pose change estimate. For example, the analysis may include segmenting the images and identifying moving items and static items. A feature extraction step may be performed on each image and fundamental matrix corresponding to the translation between the common features in the first and second image. A pose change for the mobile device 100 may be estimated based on the fundamental matrix.

At stage 712, the processor 111 in the mobile device 100 is configured to determine a misalignment calibration matrix based on the estimated pose change, such that the misalignment calibration matrix is utilized by an inertial navigation system. The navigation processor 115 includes instructions to configure the processor 111, or other processors, to determine the misalignment calibration. The estimated pose change determined at stage 710 is generally represented by a matrix and may be combined with the first orientation determined at stage 702. The result is the misalignment calibration matrix. The misalignment calibration matrix and possibly an uncertainty value may be stored in the memory unit 160 along with a time-tag or other index information to associate the misalignment calibration matrix with the second image. The correlation of the misalignment calibration matrix with the second image is intended as an iterative solution and may be used if additional orientations between the mobile body frame and the vehicle frame are detected (e.g., if the mobile device 100 is further rotated in the cradle). That is, each subsequent misalignment calibration matrix may be linked to a corresponding subsequent image.

At stage 714, the navigation processor 115 is configured to determine a current position with the inertial navigation system. The processor 111 and inertial sensors (e.g., accelerometers 140, gyroscope 145, and other sensors 150) are a means for determining a current position. The dead reckoning information obtained from the inertial sensors is calibrated based on the current orientation (e.g., the second orientation) between the mobile device 100 and the vehicle frame. The position information may be displayed (e.g., via display 182) or used by other applications, such as location based services.

Figure 8:
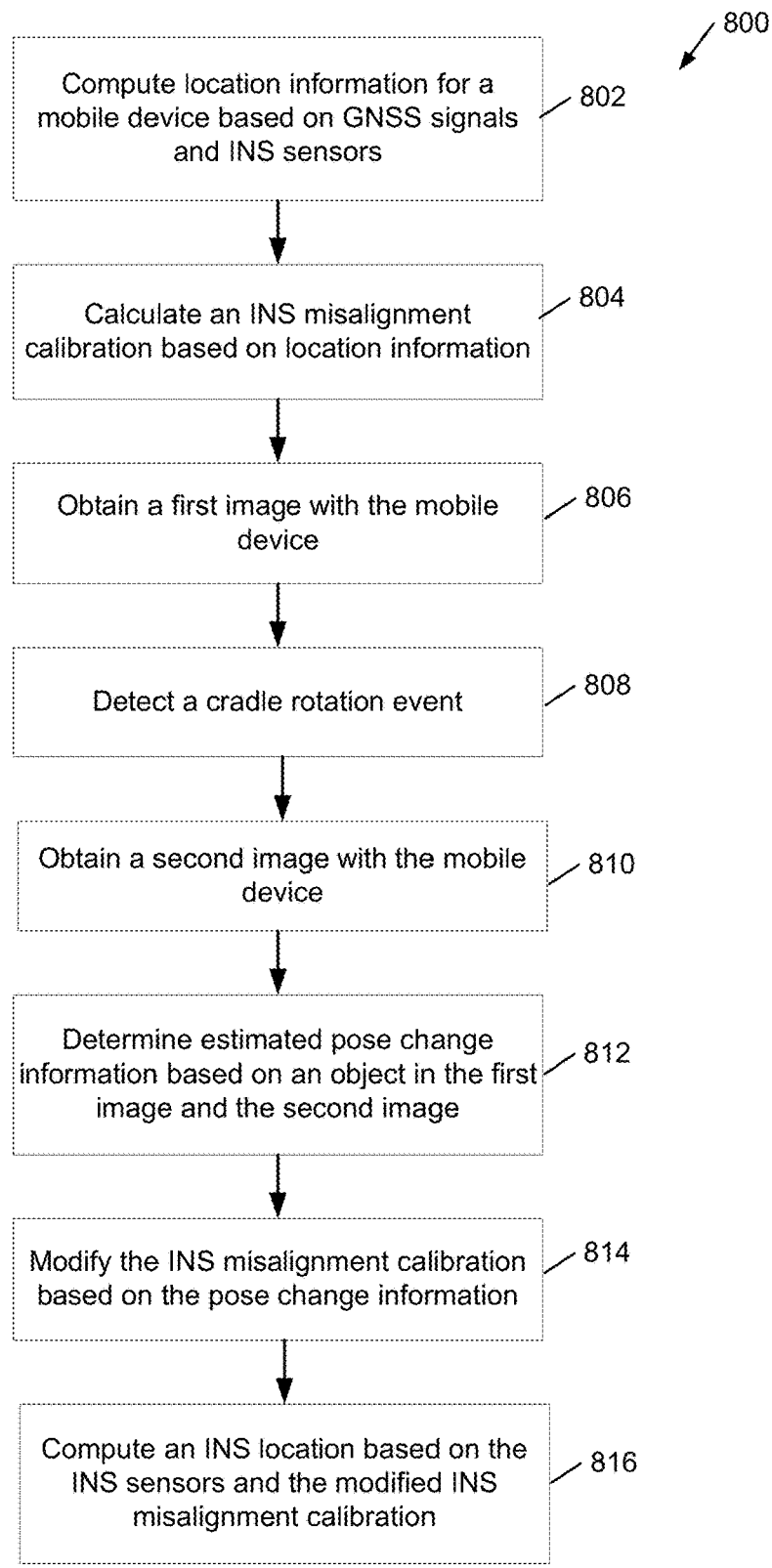
FIG. 8 is a flow diagram of another process for modifying an INS misalignment calibration based on estimated pose change information.

Referring to FIG. 8, with further reference to FIGS. 1A-5, another process 800 for modifying an INS misalignment calibration based on estimated pose change information includes the stages shown. The process 800 is, however, an example only and not limiting. The process 800 can be altered, e.g., by having stages added, removed, rearranged, combined, performed concurrently, and/or having single stages split into multiple stages. The example discussed here is an example only, and not limiting of the mobile device 100.

At stage 802, the processor 111 in the mobile device 100 is configured to compute location information based on GNSS signals and INS sensors. The navigation processor 115 is configured to utilize the processor 111 to compute location information including position information derived from the SPS signals 174 and dead reckoning information derived from one or more inertial sensors (e.g., accelerometers 140, gyroscope 145, and/or other sensors 150).

At stage 804, the processor 111 in the mobile device 100 is configured to calculate an INS misalignment calibration based on the location information. The navigation processor 115 is configured to utilize the processor 111 to compare the GNSS positions with the INS positions. The number of positions in the location information may vary based on the visibility of the GNSS satellites (e.g., accuracy of the GNSS positioning) and the track of the vehicle. In an example, the vehicle may have to change speed and direction (e.g., box the compass) to obtain satisfactory INS position information. In time (e.g., with sufficient data points), the processor 111 is configured to determine a correlation between the GNSS and the INS position information in the form of a rotation matrix. The initial rotation matrix may be used as the INS misalignment calibration.

At stage 806, the camera 105 of the mobile device 100 is configured to obtain a first image with the mobile device. As discussed, one or both of the cameras (e.g., 105a, 105b) may be used to obtain an image. The first image is associated with the INS misalignment calibration. That is, the image is obtained after the INS misalignment calibration is calculated at stage 804 and may be stored and indexed accordingly. More than one image may be indexed to the INS misalignment calibration data.

At stage 808, the processor 111 in the mobile device 100 is configured to detect a cradle rotation event. A cradle rotation event is typically an adjustment made by the vehicle operator to change the orientation of the mobile device 100 (e.g., for better viewing, from portrait to landscape, reduce glare, etc.). Other cradle rations events such as minor changes due to gravity or vehicle motion may also be detected. The inertial sensors within the mobile device 100 are a means to detect relative changes in the orientation of the mobile device 100 such as a cradle rotation event. The navigation processor 115 may store an indication such as a time-tag or other data to indicate that a cradle rotation event has occurred.

At stage 810, the camera 105 of the mobile device 100 is configured to obtain a second image. The vision aiding processor 125 may receive an event message from the navigation processor 115 to indicate that the second image should be obtained. In an example, the event message is generated in response to detecting the cradle rotation event at stage 808. The event message sent by the navigation processor may include the time-tag to indicate the time of the cradle rotation event. The second image, and the corresponding time-tag, may be stored in the memory unit 160.

At stage 812, the processor 111 in the mobile device 100 is configured to determine estimated pose change information based on an object in the first and second image. The vision aiding processor 125 includes code for image processing algorithms such as image segmentation, feature detection and pose estimation. In an example, common features in the first image and the second image may be converted to a binary pattern (e.g., based on intensity threshold). Functions may be defined across an x and a y value of a feature. The processor 111 may be configured to perform a series of convolutions along respective x and y values to determine a distance between features. Other pose estimation techniques, such as vanishing points and planar pattern detection, may be used.

At stage 814, the processor 111 in the mobile device 100 is configured to modify the INS misalignment calibration based on the pose change information. The pose change information may be represented as a rotation matrix indicating a change in orientation based on the first and second images. The processor 111 is a means to modify the INS misalignment calibration. For example, the rotation matrix derived from the pose estimation information may be applied to the INS misalignment calibration calculated at stage 804 to create a modified INS misalignment calibration. The modified INS misalignment calibration may be stored in the memory unit 160 and associated with the second image. The association may be based on the time-tag or other indexing schema.

At stage 816, the processor 111 in the mobile device 100 is configured to compute an INS location based on the INS sensors and the modified INS misalignment calibration. The navigation processor 115 includes code for receiving signals from the inertial sensors, applying the modified INS misalignment calibration and outputting the INS location. For example, the INS location may be presented on the display 182 and/or used by other location based services.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth® network, an IEEE 802.15x, for example. Wireless communication implementations described herein may also be used in connection with any combination of WWAN, WLAN or WPAN.

In another aspect, as previously mentioned, a wireless transmitter or access point may comprise a cellular transceiver device, utilized to extend cellular telephone service into a business or home. In such an implementation, one or more mobile devices may communicate with a cellular transceiver device via a code division multiple access ("CDMA") cellular communication protocol, for example.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

For an implementation involving firmware and/or software, the methodologies may be implemented with modules (e.g., processors, memory, procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory machine-readable storage medium. Examples include computer-readable media encoded with a data structure and computer-readable media encoded with a computer program. Machine or computer-readable media includes physical computer storage media (e.g., a non-transitory machine-readable medium). A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

What is claimed is:

1. An apparatus for determining alignment changes between a first body frame and a second body frame, comprising:
   a memory unit;
   one or more inertial sensors;
   at least one processor communicatively coupled to the memory unit and the one or more inertial sensors and configured to:
      determine a distance between a first position of the apparatus computed based on global navigation satellite system (GNSS) signals received by a GNSS receiver of the apparatus and a second position of the apparatus computed based on measurements of the one or more inertial sensors of the apparatus;
      obtain one or more images from an image capture device associated with the first body frame in response to detecting a change in alignment between the first body frame and the second body frame responsive to distance exceeding a distance threshold value, wherein the one or more images include an image of a fixed object associated with the second body frame, and wherein the first body frame is associated with a mobile device and the second body frame is associated with a vehicle;
      determine a compensation information, representative of an estimate of the detected change in alignment between the first body frame and the second body frame, based on an analysis of the one or more images; and
      determine a position based on the one or more inertial sensors and the compensation information representative of the estimate of the detected change in alignment between the first body frame and the second body frame.

2. The apparatus of claim 1, wherein the compensation information includes a displacement change and a pose change.

3. The apparatus of claim 1, wherein the analysis of the one or more images comprises:
   identifying features in the one or more images;
   calculating a rotation matrix based on the identified features; and
   generating a pose change estimate based on the rotation matrix.

4. The apparatus of claim 3, wherein the pose change estimate further comprises an uncertainty value generated by the at least one processor.

5. The apparatus of claim 1, wherein the one or more inertial sensors is an accelerometer.

6. The apparatus of claim 1, wherein detecting the change in alignment between the first body frame and the second body frame is derived at least from the one or more inertial sensors.

7. The apparatus of claim 1, wherein the at least one processor is configured to provide a synchronization signal.

8. The apparatus of claim 1, wherein the at least one processor is configured to:
   determine a first orientation between the first body frame and the second body frame;
   obtain an initial first image with the image capture device, wherein the initial first image includes the image of the fixed object associated with the second body frame and is associated with the first orientation; and
   determine the compensation information based the analysis of the one or more images and the initial first image.

9. The apparatus of claim 1, wherein the at least one processor configured to obtain the one or more images in response to detecting the change in alignment between the first body frame and the second body frame is configured to:
   obtain the one or more images in response to detecting the change in alignment between the first body frame and the second body frame based on measurements of the one or more inertial sensors.

10. A method for determining alignment changes between a first body frame and a second body frame, comprising:
    determining a distance between a first position of the first body frame based on global navigation satellite system (GNSS) signals received by a GNSS receiver of the apparatus and a second position of the first body frame computed based on measurements of the one or more inertial sensors of the apparatus;
    obtaining one or more images from an image capture device associated with the first body frame in response to detecting a change in alignment between the first body frame and the second body frame responsive to distance exceeding a distance threshold value, wherein the one or more images include an image of a fixed object associated with the second body frame, and wherein the first body frame is associated with a mobile device and the second body frame is associated with a vehicle;
    determining a compensation information, representative of an estimate of the detected change in alignment between the first body frame and the second body frame, based on an analysis of the one or more images; and
    determining a position based on one or more inertial sensors and the compensation information representative of the estimate of the detected change in alignment between the first body frame and the second body frame.

11. The method of claim 10, wherein the compensation information includes a displacement change and a pose change.

12. The method of claim 10, wherein the analysis of the one or more images comprises:
    identifying common features in the one or more images;
    calculating a rotation matrix based on the identified common features; and generating a pose change estimate based on the rotation matrix.

13. The method of claim 12, wherein generating the pose change estimate includes generating an uncertainty value.

14. The method of claim 10, wherein detecting the change in alignment between the first body frame and the second body frame is based on information received from an inertial sensor.

15. The method of claim 14, further comprising synchronizing a detection of the change in alignment and the determining of the compensation information.

16. The method of claim 10, further comprising:
  determining a first orientation between the first body frame and the second body frame;
  obtaining an initial first image with the image capture device, wherein the initial first image includes the image of the fixed object associated with the second body frame and is associated with the first orientation; and
  determining the compensation information based the analysis of the one or more images and the initial first image.

17. The method of claim 10, further comprising outputting the compensation information to an inertial navigation system.

18. A non-transitory machine-readable medium comprising instructions for determining alignment changes between a first body frame and a second body frame, the instructions comprising:
  code for determining a distance between a first position of the first body frame based on global navigation satellite system (GNSS) signals received by a GNSS receiver associated with the first body frame and a second position of the first body frame computed based on measurements of the one or more inertial sensors associated with the first body frame;
  code for obtaining one or more images from an image capture device associated with the first body frame in response to detecting a change in alignment between the first body frame and the second body frame responsive to distance exceeding a distance threshold value, wherein the one or more images include an image of a fixed object associated with the second body frame and wherein the first body frame is associated with a mobile device and the second body frame is associated with a vehicle;
  code for determining a compensation information, representative of an estimate of the detected change in alignment between the first body frame and the second body frame, based on an analysis of the one or more images; and
  code for determining a position based on one or more inertial sensors and the compensation information representative of the estimate of the detected change in alignment between the first body frame and the second body frame.

19. The non-transitory machine-readable medium of claim 18, wherein the compensation information includes a displacement change and a pose change.

20. The non-transitory machine-readable medium of claim 18, wherein the code for determining the compensation information based on the analysis of the one or more images includes:
  code for identifying common features in the one or more images;
  code for calculating a rotation matrix based on the identified common features; and
  code for generating a pose change estimate based on the rotation matrix.

21. The non-transitory machine-readable medium of claim 20, wherein the code for generating the pose change estimate based on the rotation matrix includes code for generating an uncertainty value.

22. The non-transitory machine-readable medium of claim 18, wherein detecting the change in alignment between the first body frame and the second body frame includes code for receiving information from the one or more inertial sensors.

23. The non-transitory machine-readable medium of claim 22, wherein the instructions include code for synchronizing a detection of the change in alignment and the determining of the compensation information.

24. The non-transitory machine-readable medium of claim 18, wherein the instructions include:
  code for determining a first orientation between the first body frame and the second body frame;
  code for obtaining an initial first image with the image capture device, wherein the initial first image includes the image of the fixed object associated with the second body frame and is associated with the first orientation; and
  code for determining the compensation information based the analysis of the one or more images and the initial first image.

25. The non-transitory machine-readable medium of claim 18, wherein the instructions include code for outputting the compensation information to a navigation unit.

26. An apparatus for determining alignment changes between a first body frame and a second body frame, comprising:
  means for determining a distance between a first position of the apparatus computed based on global navigation satellite system (GNSS) signals received by a GNSS receiver of the apparatus and a second position of the apparatus computed based on measurements of the one or more inertial sensors of the apparatus;
  means for obtaining one or more images from an image capture device associated with the first body frame in response to detecting a change in alignment between the first body frame and the second body frame, wherein the one or more images include an image of a fixed object associated with the second body frame, and wherein the first body frame is associated with a mobile device and the second body frame is associated with a vehicle;
  means for determining a compensation information, representative of an estimate of the detected change in alignment between the first body frame and the second body frame responsive to distance exceeding a distance threshold value, based on an analysis of the one or more images; and
  means for determining a position based on one or more inertial sensors and the compensation information representative of the estimate of the detected change in alignment between the first body frame and the second body frame.

27. The apparatus of claim 26, wherein the means for determining the compensation information includes a means for determining a displacement change and a means for determining a pose change.

28. The apparatus of claim 26, wherein the analysis of the one or more images comprises:
  means for identifying common features in the one or more images;

means for calculating a rotation matrix based on the identified common features; and means for generating a pose change estimate based on the rotation matrix.

29. The apparatus of claim 26, further comprising:

means for determining a first orientation between the first body frame and the second body frame;

means for obtaining an initial first image with the image capture device, wherein the initial first image includes the image of the fixed object associated with the second body frame is associated with the first orientation; and means for determining the compensation information based the analysis of the one or more images and the initial first image.

30. The apparatus of claim 26, wherein detecting the change in alignment between the first body frame and the second body frame includes means for receiving information from the one or more inertial sensors.

31. The apparatus of claim 30, wherein the means for outputting the compensation information include means for outputting the compensation information to an applications processor.

* * * * *